(12) United States Patent
Batterywala

(10) Patent No.: US 8,868,495 B2
(45) Date of Patent: Oct. 21, 2014

(54) SYSTEM AND METHOD FOR INDEXING USER DATA ON STORAGE SYSTEMS

(75) Inventor: Yusuf Batterywala, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1198 days.

(21) Appl. No.: 11/847,925

(22) Filed: Aug. 30, 2007

(65) Prior Publication Data

US 2008/0201384 A1    Aug. 21, 2008

(30) Foreign Application Priority Data

Feb. 21, 2007  (IN) .............................. 358/DEL/2007

(51) Int. Cl.
  *G06F 17/30* (2006.01)
(52) U.S. Cl.
  CPC ........ *G06F 17/30091* (2013.01); *G06F 17/301* (2013.01)
  USPC .......................................... 707/613; 707/634
(58) Field of Classification Search
  None
  See application file for complete search history.

(56) References Cited

U.S. PATENT DOCUMENTS

| | | | |
|---|---|---|---|
| 4,570,217 A | 2/1986 | Allen et al. | |
| 4,876,643 A | 10/1989 | McNeill et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,403,667 A | 4/1995 | Simoens | |
| 5,485,579 A | 1/1996 | Hitz et al. | |
| 5,511,177 A | 4/1996 | Kagimasa et al. | |
| 5,581,724 A | 12/1996 | Belsan et al. | |
| 5,742,817 A | 4/1998 | Pinkoski | |
| 5,802,366 A | 9/1998 | Row et al. | |
| 5,819,292 A | 10/1998 | Hitz et al. | |
| 5,897,661 A | 4/1999 | Baranovsky et al. | |
| 5,931,918 A | 8/1999 | Row et al. | |
| 5,941,972 A | 8/1999 | Hoese et al. | |
| 5,948,110 A | 9/1999 | Hitz et al. | |
| 5,963,962 A | 10/1999 | Hitz et al. | |

(Continued)

FOREIGN PATENT DOCUMENTS

| | | |
|---|---|---|
| IN | 358/DEL/2007 | 2/2007 |
| WO | WO 2004/015521 | 2/2004 |
| WO | WO 2004/015522 | 2/2004 |

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

(Continued)

*Primary Examiner* — Son T Hoang
(74) *Attorney, Agent, or Firm* — Cesari and McKenna, LLP

(57) ABSTRACT

A system and method for indexing user data on storage systems is provided. A client of the storage system executes a novel client side agent that is configured to detect changes to data stored by the client on the storage system. In response to detecting that data has been modified, the agent examines modified data containers and parses the modified data to identify new and/or modified index terms or the creation/deletion of data containers. Once the data has been parsed by the agent to identify new/modified index terms, the parsed data is transmitted from the agent to a management module executing on a management server. The management module receives the parsed data and updates a search database using the received parsed data.

19 Claims, 8 Drawing Sheets

(56) References Cited

U.S. PATENT DOCUMENTS

| | | | |
|---|---|---|---|
| 6,009,481 A | 12/1999 | Mayer | |
| 6,021,409 A * | 2/2000 | Burrows | 1/1 |
| 6,038,570 A | 3/2000 | Hitz et al. | |
| 6,061,770 A | 5/2000 | Franklin | |
| 6,065,010 A * | 5/2000 | Otsuka et al. | G06F 17/30 |
| 6,065,037 A | 5/2000 | Hitz et al. | |
| 6,081,875 A | 6/2000 | Clifton et al. | |
| 6,119,244 A | 9/2000 | Schoenthal et al. | |
| 6,138,126 A | 10/2000 | Hitz et al. | |
| 6,185,655 B1 | 2/2001 | Peping | |
| 6,192,408 B1 | 2/2001 | Vahalia et al. | |
| 6,230,200 B1 | 5/2001 | Forecast et al. | |
| 6,282,658 B2 | 8/2001 | French et al. | |
| 6,341,341 B1 | 1/2002 | Grummon et al. | |
| 6,425,035 B2 | 7/2002 | Hoese et al. | |
| 6,434,681 B1 | 8/2002 | Armangau | |
| 6,560,615 B1 | 5/2003 | Zayas et al. | |
| 6,574,591 B1 | 6/2003 | Kleiman et al. | |
| 6,604,118 B2 | 8/2003 | Kleiman et al. | |
| 6,606,690 B2 | 8/2003 | Padovano | |
| 6,636,908 B1 | 10/2003 | Winokur et al. | |
| 6,636,981 B1 | 10/2003 | Barnett et al. | |
| 6,671,773 B2 | 12/2003 | Kazar et al. | |
| 6,707,818 B1 | 3/2004 | Kadambi et al. | |
| 6,735,636 B1 | 5/2004 | Mokryn et al. | |
| 6,751,219 B1 | 6/2004 | Lipp et al. | |
| 6,868,417 B2 | 3/2005 | Kazar et al. | |
| 6,883,073 B2 | 4/2005 | Arakawa et al. | |
| 6,895,413 B2 | 5/2005 | Edwards | |
| 6,981,268 B2 | 12/2005 | Shi et al. | |
| 6,993,027 B1 | 1/2006 | Kadambi et al. | |
| 6,993,539 B2 | 1/2006 | Federwisch et al. | |
| 7,007,046 B2 | 2/2006 | Manley et al. | |
| 7,010,553 B2 | 3/2006 | Chen et al. | |
| 7,039,656 B1 * | 5/2006 | Tsai et al. | 1/1 |
| 7,039,663 B1 | 5/2006 | Federwisch et al. | |
| 7,043,485 B2 | 5/2006 | Manley et al. | |
| 7,076,509 B1 * | 7/2006 | Chen et al. | G06F 17/30 |
| 7,099,866 B1 | 8/2006 | Crosbie et al. | |
| 7,103,616 B1 | 9/2006 | Harmer et al. | |
| 7,107,273 B2 | 9/2006 | Ohata et al. | |
| 7,107,385 B2 | 9/2006 | Rajan et al. | |
| 7,127,577 B2 | 10/2006 | Koning et al. | |
| 7,162,473 B2 | 1/2007 | Dumais et al. | |
| 7,225,204 B2 | 5/2007 | Manley et al. | |
| 7,227,862 B2 | 6/2007 | Kalkunte et al. | |
| 7,284,030 B2 | 10/2007 | Ackaouy et al. | |
| 7,299,463 B2 | 11/2007 | Brannock et al. | |
| 7,310,332 B2 | 12/2007 | Kadambi et al. | |
| 7,313,720 B1 | 12/2007 | Eng et al. | |
| 7,340,639 B1 | 3/2008 | Lee et al. | |
| 7,346,623 B2 | 3/2008 | Prahlad et al. | |
| 7,383,288 B2 | 6/2008 | Miloushev et al. | |
| 7,386,546 B1 | 6/2008 | Sentry et al. | |
| 7,409,494 B2 | 8/2008 | Edwards et al. | |
| 7,440,467 B2 | 10/2008 | Gallatin et al. | |
| 7,454,445 B2 | 11/2008 | Lewis et al. | |
| 7,478,101 B1 | 1/2009 | Manley | |
| 7,523,343 B2 | 4/2009 | Leis et al. | |
| 7,539,707 B2 | 5/2009 | Prahlad et al. | |
| 7,568,080 B2 | 7/2009 | Prahlad et al. | |
| 7,571,158 B2 * | 8/2009 | Vedula | 1/1 |
| 7,596,713 B2 | 9/2009 | Mani-Meitav et al. | |
| 7,617,365 B2 | 11/2009 | Zhang et al. | |
| 2002/0175938 A1 | 11/2002 | Hackworth | |
| 2003/0149683 A1 * | 8/2003 | Lee et al. | 707/1 |
| 2003/0167380 A1 | 9/2003 | Green et al. | |
| 2003/0177324 A1 * | 9/2003 | Timpanaro-Perrotta | 711/162 |
| 2003/0227487 A1 * | 12/2003 | Hugh | 345/777 |
| 2003/0233618 A1 * | 12/2003 | Wan | 715/513 |
| 2004/0022278 A1 | 2/2004 | Thomas et al. | |
| 2004/0030668 A1 | 2/2004 | Pawlowski et al. | |
| 2004/0250033 A1 * | 12/2004 | Prahlad et al. | 711/162 |
| 2005/0015354 A1 | 1/2005 | Grubbs et al. | |
| 2005/0021512 A1 * | 1/2005 | Koenig | 707/3 |
| 2005/0114408 A1 * | 5/2005 | Gold et al. | 707/203 |
| 2005/0192974 A1 | 9/2005 | DeLorme et al. | |
| 2005/0228835 A1 * | 10/2005 | Roa | 707/204 |
| 2006/0064476 A1 * | 3/2006 | Decasper et al. | 709/223 |
| 2006/0085471 A1 * | 4/2006 | Rajan et al. | 707/102 |
| 2006/0242212 A1 | 10/2006 | Brinkmann et al. | |
| 2006/0265358 A1 * | 11/2006 | Hara et al. | 707/3 |
| 2006/0265497 A1 | 11/2006 | Ohata et al. | |
| 2006/0277221 A1 | 12/2006 | Zavisca et al. | |
| 2006/0288026 A1 | 12/2006 | Zayas et al. | |
| 2007/0094465 A1 | 4/2007 | Sharma et al. | |
| 2007/0136243 A1 * | 6/2007 | Schorn | 707/3 |
| 2007/0168400 A1 * | 7/2007 | Lee et al. | 707/201 |
| 2007/0185940 A1 | 8/2007 | Prahlad et al. | |
| 2007/0203938 A1 * | 8/2007 | Prahlad et al. | 707/102 |
| 2007/0250663 A1 | 10/2007 | Welsh et al. | |
| 2008/0021902 A1 * | 1/2008 | Dawkins et al. | 707/10 |
| 2008/0270520 A1 * | 10/2008 | Reid et al. | 709/203 |
| 2009/0043798 A1 * | 2/2009 | Tan et al. | 707/102 |

OTHER PUBLICATIONS

Asante Technologies Inc., Asante Desktop EN/SC Adapters User's Manual, Apr. 1996, San Jose, CA, 29 pages.

Asante Technologies Inc., Asante EN/SC Adapter Family Installation Guide, May 1994, San Jose, CA, 60 pages.

Bitton, Dina, Disk Shadowing, Proceedings of the 14.sup.th VLDB Conference, LA, CA (1988), 8 pages.

Callaghan, B., NFS Version 3 Protocol Specification, Network Working Group, Request for Comments 1813, Jun. 1995, 118 pages.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992, 18 pages.

Computerwire, Network Appliance Ends NAS/SAN War, The Register, http://www.theregister.co.uk/content/63/27368.html, Oct. 2002, 2 pages.

Coyne, Robert A., et al., Storage Systems for National Information Assets, Proc. Supercomputing 92, Minneapolis, Nov. 1992, pp. 626-633.

EMC², Celerra File Server Architecture for High Availability, EMC² Corporation, Aug. 1999, 12 pages.

Fielding, et al., Hypertext Transfer Protocol—HTTP/1.1, Network Working Group, Request for Comments 2616, Jun. 1999, 143 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Glider, et al., The Software Architecture of a SAN Storage Control System, IBM Systems Journal vol. 42, No. 2, 2003, pp. 232-249.

Goodson, et al., System and Method for Nearly In-Band Search Indexing, U.S. Appl. No. 11/590,381, filed Oct. 31, 2006, 22 pages.

Gray, Jim, et al., The Recovery Manager of the System R Database Manager, ACM Computing Surveys, (13)2:223-242 1981, 20 pages.

Hecht, Matthew S., et al. Shadowed Management of Free Disk Pages with a Linked List, ACM Transactions on Database Systems, 8/4, Dec. 1983, pp. 503-514.

Hitz, Dave et al., File System Design for an NFS File Server Appliance, Technical Report 3002, Rev. C395, presented Jan. 19, 1994, 23 pages.

Howard, John H, et al., Scale and Performance in a Distributed File System, Carnegie Mellon University, CMU-ITC-87-068, Aug. 5, 1987, 33 pages.

Howard, John H., An Overview of the Andrew File System, Carnegie Mellon University, CMU-ITC-88-062 1988, 6 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

(56) References Cited

OTHER PUBLICATIONS

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Klampanos, et al., Retrieval Efficiency in Peer-to-Peer Networks with Replication Restrictions, Database and Expert Systems Applications, 2005, Proceedings of the 16th International Workshop, Aug. 2005, pp. 758-763.

Kourai, et al., HyperSpector: Virtual Distributed Monitoring Environments for Secure Intrusion Detection, ACM, Jun. 2005, pp. 197-207.

Lorie, Raymond, A, Physical Integrity in a large segmented database, ACM Trans. Database Systems, 2(1): 91-104, Mar. 1977.

Lu, Y., Performance Study of iSCSI-Based Storage Subsystems, IEEE Communication Magazine, Aug. 2003, pp. 76-82.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Pasupathy, et al., System and Method for Quickly Determining Changed Metadata Using Persistent Consistency Point Image Differencing, U.S. Appl. No. 11/324,429, filed Jan. 3, 2006, 46 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached Worm File System, Software-Practice and Experience, 21(12):1289-1299 (1991).

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Snia, Common Internet File System (CIFS), Version CIFS-Spec 0.9, Storage Networking Industry Association, Mar. 2001, 126 pages.

Stager, et al., Network Data Management Tool, Network Working Group, Internet Draft, Oct. 1996, 49 pages.

Storage Computer, Performance Without Compromise: The Virtual Storage Architecture, Storage Computer Corporation, 1997, 11 pages.

Subramanian, Muralidhar, et al., Performance Challenges in Object-Relational DBMSs, Data Engineering Journal 22, Feb. 1999 pp. 28-32.

SunOS 5.9, nd-network disk control, Reference Manual pp. ND (4P), Jul. 1985, 3 pages.

SunOS 5.9, nd-network disk control, Reference Manual pp. ND (8C), Feb. 1985, 1 page.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

U.S. Appl. No. 10/215,917, entitled Multi-Protocol Storage Appliance That Provides Integrated Support for File and Block Access Protocols, filed Aug. 9, 2002, by Brian Pawlowski, et al., 35 pages.

* cited by examiner

SYSTEM AND METHOD FOR INDEXING USER DATA ON STORAGE SYSTEMS

FIELD OF THE INVENTION

The present invention claims priority to commonly owned Indian Patent Application Serial No. 358/DEL/2007, entitled SYSTEM AND METHOD FOR INDEXING USER DATA ON STORAGE SYSTEMS, by Yusuf Batterywala, on Feb. 21, 2007, the contents of which are hereby incorporated by reference.

FIELD OF THE INVENTION

The present invention relates to storage systems and, in particular, to indexing user data on storage systems.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual user data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporary basis.

The file server, or storage system, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Certain storage systems may support multi-protocol access and, to that end, enable clients to access data via both block and file-level requests. One example of such a storage system is described in U.S. patent application Ser. No. 10/215,917, entitled MULI-PROTOCOL STORAGE APPLIANCE THAT PROVIDES INTEGRATED SUPPORT FOR FILE AND BLOCK ACCESS PROTOCOLS, by Brian Pawlowski, et al.

One common use for a storage system that supports block-based protocols is to export one or more data containers, such as luns, for use by a client of the storage system. The client typically includes an operating system and/or a volume manager that forms the data containers into one or more volume (or disk) groups. A volume group is a set of luns aggregated to provide a storage space that may be utilized by the client to overlay one or more file systems or other structured storage thereon. As used herein, the term storage space means storage managed by a client that utilizes one or more data containers hosted by one or more storage systems, an example of which is a file system overlaid onto a volume group that comprises one or more luns stored within a plurality of volumes of a single storage system or within a plurality of volumes of a plurality of storage systems. Another example of a storage space is a volume group managed by a client to enable an application, such as a database application, to store structured data thereon.

Storage system users often may wish to search the data containers stored on a storage system to identify those containers that contain user data matching one or more search criteria, such as phrases and terms. As noted, a data container may include a file, a directory, a virtual disk (vdisk), or other data construct that is addressable via a storage system. For example, a user may wish to search and locate all data containers serviced by the storage system that contain user data matching the phrase "Accounts Receivable." By enabling searching of data containers on storage systems, users may improve utilization of their data, especially in large enterprises where the number of data containers may be in substantial, e.g., the tens or hundreds of millions.

To identify data containers that contain user data that match the search criteria, a search process may need to examine all of the data containers within the storage system every time a search is requested. In a typical storage system having a substantial number of data containers, this is not a practical solution due to the substantial amount of time required to access and process every data container to determine if it contains the search criteria. To enable faster searching, a search index of information associated with the data containers may be generated for the storage system. The storage system search index may be constructed by performing a file system "crawl" through the entire file system (or other data container organizational structure) serviced by the storage system. Typically, a file system crawl involves accessing every data container within the file system to obtain the necessary index information. However, such a file system crawl is expensive both in terms of disk input/output operations and processing time, and suffers from the same practical problems of directly accessing each data container. That is, the file system crawl may substantially impede access to the file system, e.g., for tens of minutes at a time, which results in an unacceptable loss of performance.

Furthermore, the file system crawl is typically performed at regular intervals (periodically) to maintain up-to-date index information. As a result of the substantial processing time required, a further disadvantage of the file system crawl is that the periodic search index information may be inconsistent with the current state of the file system, i.e., the index information only represents the file system as of the completion of the last file system crawl.

A further noted disadvantage arises in a storage system environment where a client overlays a file system or other structured storage onto storage space provided by a storage system. In such an environment, indexing functionality within the storage system may not operate as the overlaid file system that may utilize a different format than that of the storage system's native file system format. This prevents a storage system administrator, who may support a plurality of differing vendors of clients, from being able to quickly and efficiently search through user data to enable users to identify data containers containi- desired search terms.

SUMMARY OF THE INVENTION

The present invention overcomes the disadvantages of the prior art by providing a system and method for indexing user data of data containers stored on storage space provided by one or more storage systems. A management module configured to implement indexing and searching functionality executes on a management server that is operatively interconnected with each storage system. Each client of the storage system executes a novel client side agent that is configured to detect changes to user data stored by the client on the storage system. In response to detecting that the data has been changed/modified, the agent examines each modified data container and parses the modified data to identify new and/or modified index terms or the creation/deletion of data container. Notably, the client-side agent may utilize client based file system (or other storage management) functionality to access the data overlaid onto the storage space exported by a storage system.

Once the data has been parsed to identify new/modified index terms, the agent transmits the parsed data to the data management module executing on the management server. The data management module receives the parsed data and updates a search database using the received data.

Upon initiating a search, the user enters a search query into a user interface of the data management module. In response, the data management module formulates a database query forwards the query to the search database, which process the query and forwards the query to the search database. The search database processes the query and returns the results to the data management module. The data management module then displays the results of the query to the user. The data management module may filter the displayed results based on access controls determined by, e.g., permissions associated with the user entering the query.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION

A. Network Environment

Figure 1:
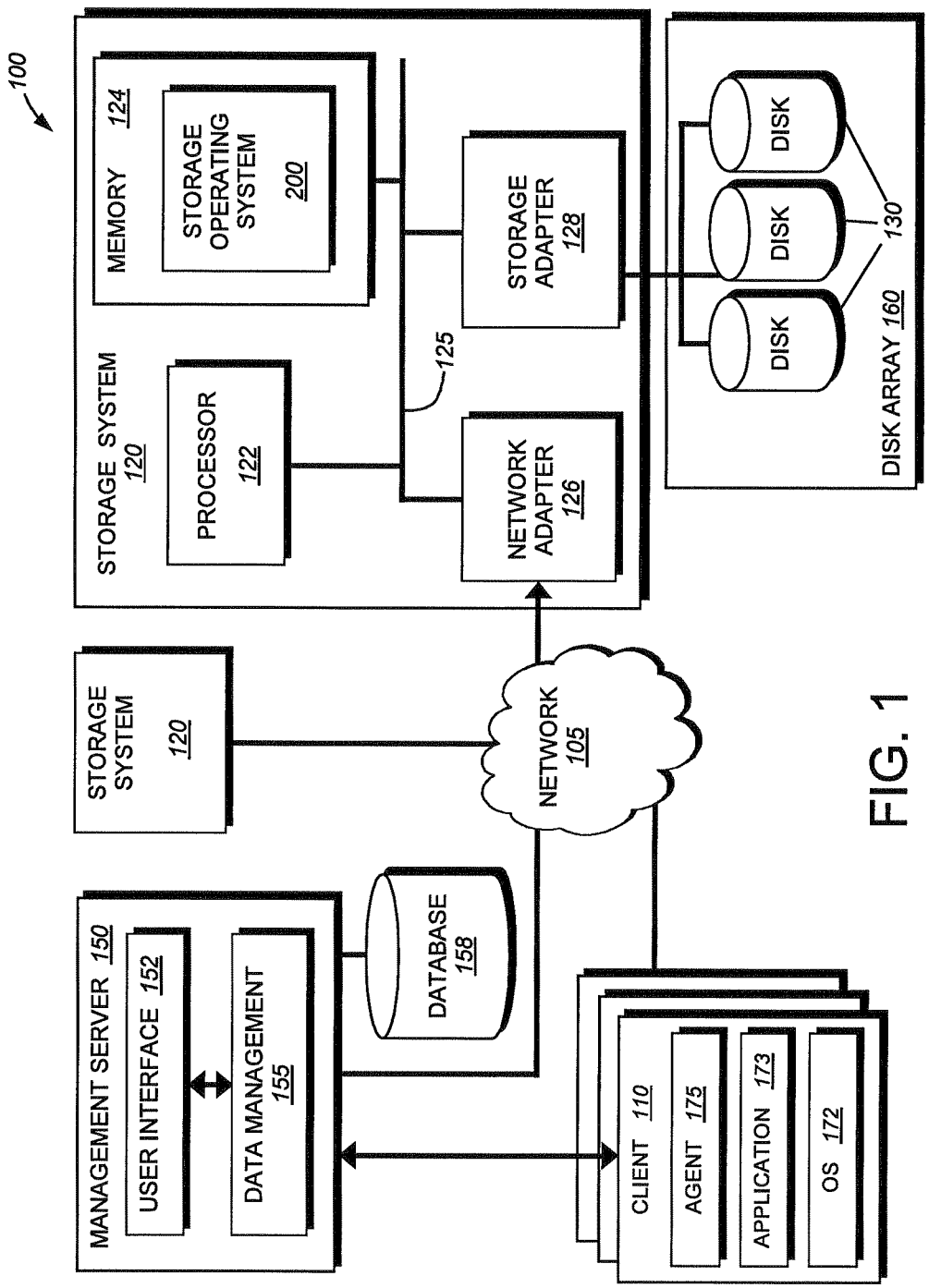
FIG. 1 is a schematic block diagram of an exemplary storage system environment in accordance with an illustrative embodiment of the present invention.

FIG. 1 is a schematic block diagram of an environment 100 including a storage system 120 that may be advantageously used with the present invention. The storage system is illustratively a computer that provides storage service relating to the organization of information on storage devices, such as disks 130 of a disk array 160. It should be noted that in alternate embodiments, a plurality of storage systems 120 may be utilized. As such, the description of a single storage system should be taken as exemplary only. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of data containers, such as directories, files and special types of files called virtual disks (hereafter logical units or "luns") on the disks.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 105, which may comprise a point-to-point connection or a shared medium, such as a local area network (LAN) or wide area network (WAN). Illustratively, the computer network 105 may be embodied as an Ethernet network or a Fibre Channel (FC) network. The client 110 may communicate with the storage system over network 105 by exchanging discrete frames or packets of data according to pre-defined protocols, such as the Transmission Control Protocol/Internet Protocol (TCP/IP) or SCSI encapsulated in FC (FCP).

The client 110 may be a general-purpose computer configured to execute an operating system (OS) 172, an application 173 and a novel agent 175. The operating system 172 may be a conventional operating system such as Microsoft Windows available from Microsoft Corp., a Linux-based operating system, etc. The operating system may include the functionality of a file system and/or a volume manager and execute one or more applications 173, such as a database that utilizes raw storage space available by the operating system. The operating system 172 and applications 173 executing thereon may utilize storage exported by the storage system 120. As noted above, the operating system 172 may overlay a file system or other form of structured storage onto one or more exported luns from the storage system 120.

A novel agent 175 executes within the client 110 to identify modifications that occur to data containers managed by the client and to update a data management module 155 executing on a management module 150 in accordance with the principles of the pre-sent invention. Specifically, the agent 175 tracks modifications to the data containers by, e.g., routinely scanning for changes to, e.g., user data of the containers. In response to identifying such changes, the agent parses the data to identify new and/or modified index terms. In alternate embodiments, the agent 175 may include the capability to have plugins associated therewith. Such plugin modules may add functionality to parse differing data formats to enable the agent 175 to parse a greater variety of data container formats.

These parsed index terms are then forwarded to data management module 155 executing on management server 150. Illustratively, the management server 150 is a separate computer executing within environment 100. However, in alternate embodiments, the functionality of the management server 150 and/or data management module 155 may be integrated with client 110 and/or storage system 120. As such, the description of a separate management server 150 should be taken as exemplary only. The data management module 155 provides functionality for indexing and searching user data overlaid onto storage space provided by the storage system 120. The management server 150 also includes an exemplary user interface 152 to enable administrators and/or other users access to the data management module 155 for purposes of, e.g., entering search queries.

The management server 150 is operatively interconnected with a search database 158 utilized to maintain index information for user data. The search database 158 may be implemented within the management server 150 or via a separate database server. As described further below, the search database 158 may be implemented using a variety of data structures, e.g., tables to track particular search terms, as well as the data containers containing those terms for purposes of responding to queries entered by a user.

The client 110 may interact with the storage system 120 in accordance with a client/server model of information delivery. That is, the client may request the services of the storage system, and the system may return the results of the services requested by the client, by exchanging packets over the network 105. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named data containers, such as directories and files, on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of data container, such as blocks, on the disks that are exported as named luns.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
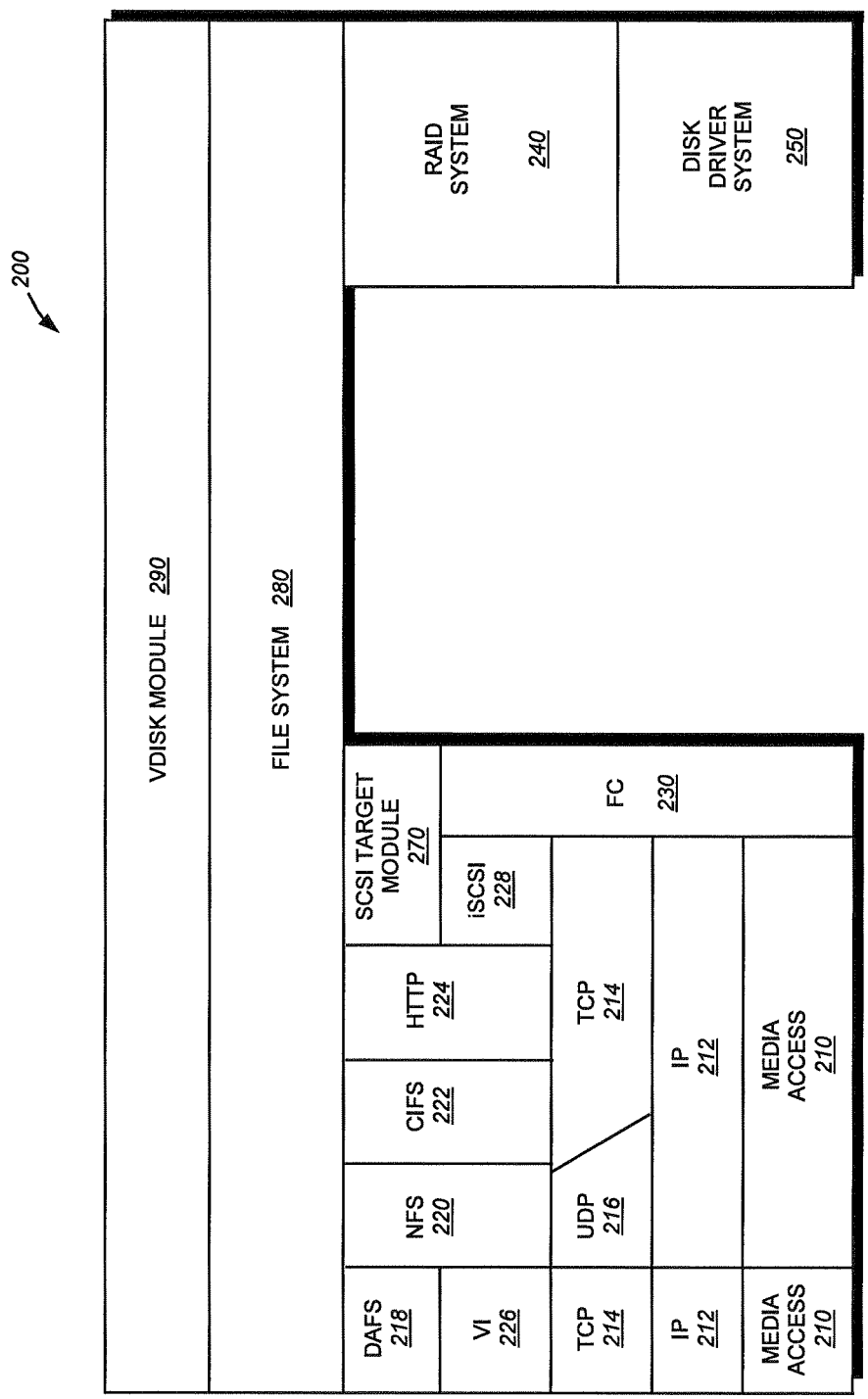
FIG. 2 is a schematic block diagram of an exemplary storage operating system executing on a storage system in accordance with an illustrative embodiment of the pre-sent invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet over the computer network 105 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core". If the information is not in core, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk, dbn) and sent to an appropriate driver (e.g., SCSI) of the disk driver system 250. The disk driver accesses the dbn from the specified disk 130 and loads the requested data block(s) in memory 124 for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the file system module to implement the file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in previously mentioned U.S. patent application Ser. No. 10/215,917 titled MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
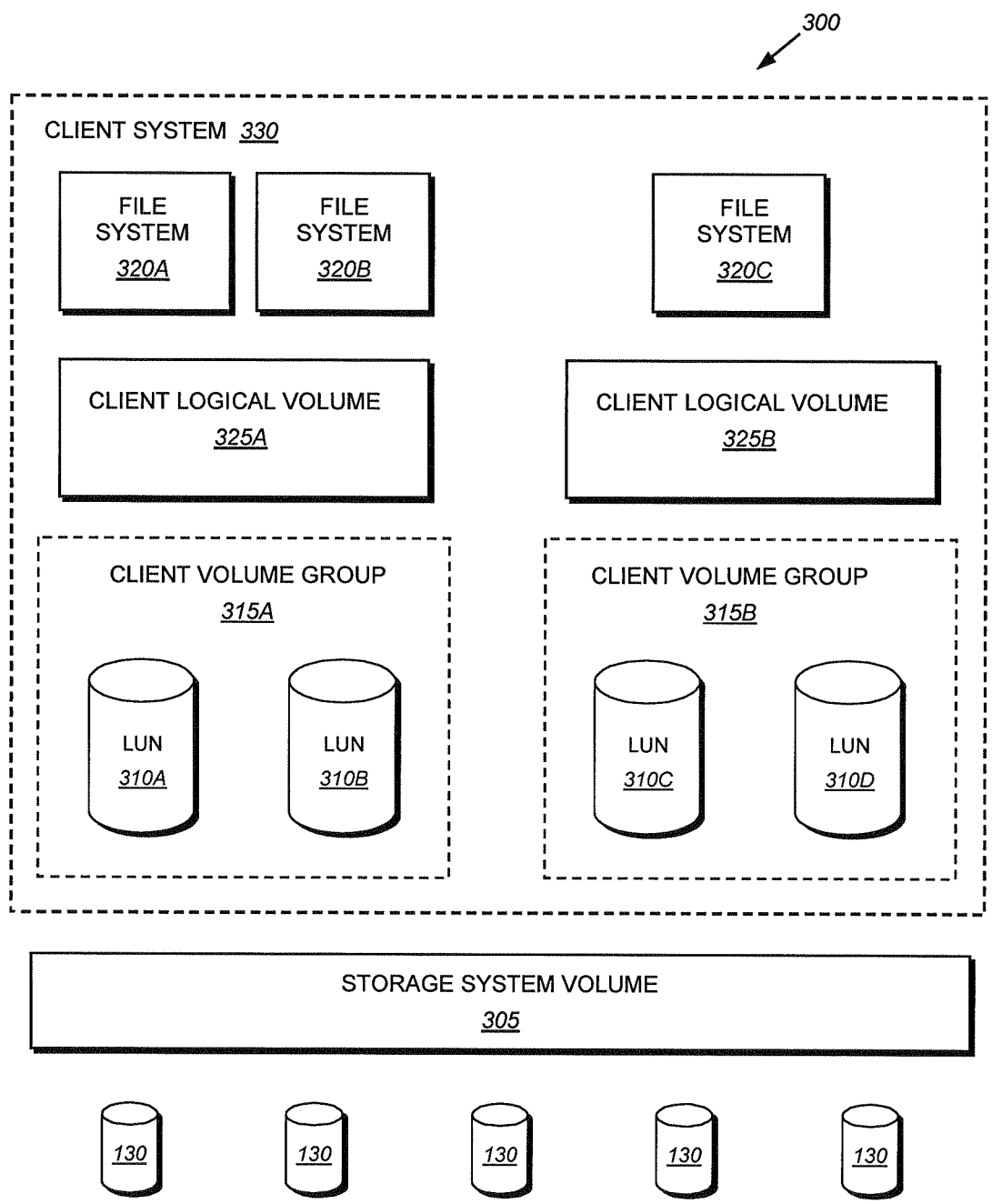
FIG. 3 is a schematic block diagram showing file systems overlaid onto a volume group comprising one or more luns in accordance with an illustrative embodiment of the present invention.

FIG. 3 is a schematic block diagram of an exemplary environment 300 showing a number of file systems overlaid onto logical volumes existing within volume groups in accordance with an embodiment of the present invention. At the base of the environment 300 are disks 130 associated with storage system 120. Overlaid onto the disks 130 is a storage system volume 305 that includes a number of luns 310A-D, which may be exported by the storage system. In the illustrative environment 300 a plurality of volume groups 315 is maintained and managed by a client 110 of the storage system 120. The volume groups 315 are illustratively managed by file system or volume manager functionality within the operating system 172 of the client 170. Alternately, a volume manager system may be implemented to organize the volumes into volume groups for use by clients. As such, the description of the storage space as organized into client volume groups by a client operating system should be taken as exemplary only. The first volume group 315A comprises luns 310 A, B, whereas the second volume group 315B comprises luns 310 C, D. The client may overlay a number of file systems onto logical volumes defined within the volume groups 315 although this is not a requirement of the illustrative environment. That is, instead of overlaying file systems onto the logical volumes, the client may access the logical volume as a region of raw data storage. In the illustrative environment 300, however, file system 320A, B are overlaid onto host logical volume 325A within volume group 315A, and similarly, file system 320C is overlaid onto host logical volume 325B within volume group 315 B.

As noted above, user data contained in file systems 320 or logical volumes 325 may be stored in a format different than that utilized by the storage system for volume 305 and/or luns 310. Thus, the agent 175 may utilize the operating system 172 to access the user data stored in file system 320 and/or logical volumes 325.

D. Indexing User Data

The present invention provides a system and method for indexing user data of data containers stored on one or more storage systems. This enables users to locate data quickly, without the requirement of performing slow file system crawls to locate data containers containing identified search terms. A management module configured to implement indexing and searching functionality executes on a management server that is operatively interconnected with the storage system. Each client of the storage system executes a novel client side agent that is configured to detect changes to data stored by the client on the storage system. In response to detecting that data has been modified, the agent examines the modified data containers and parses the modified data to identify new and/or modified index terms or the creation/deletion of data containers. Notably, the client-side agent may utilize client based file system (or other storage management) functionality to access the data overlaid onto storage space exported by the storage system.

Once the data has been parsed to identify new/modified index terms, the agent transmits the parsed data to the management module executing on the management server. The management module receives the parsed data and updates a search database using the received data.

Upon initiating a search, the user enters an appropriate search query into a user interface of the data management module. For example, a user may desire to locate all files with the term "Accounts Receivable." In response, the data management module formulates database query and forwards the query to the search database, which process the query and returns results to the data management module. The data management module then displays the results of the query to the user. As noted, a crawl is not performed through the file system (or storage space) on the storage system to locate the data containers, thereby improving search times and reducing the amount of resources consumed by the search.

As noted above, the search database 158 is utilized by the data management module 155 to track index information in accordance with an illustrative embodiment of the present invention. The database may be implemented using conventional database techniques, such as using a structured query language (SQL) database. Illustratively, the search database manages associations between specific index search words, files (or other data containers) and the storage system hosting the data containers.

The search database 158 illustratively implements a schema that organizes information as a plurality of data structures (such as tables) including, e.g., a word table data structure 400, a file table data structure 500 and/or one or more content table data structures 600. It should be noted that the description of various data structures contained within the search database should be taken as exemplary only and that alternate techniques for organizing search information may be utilized in accordance with the principles of the present invention. As such, the search database schema described herein should be taken as exemplary only.

Figure 4:
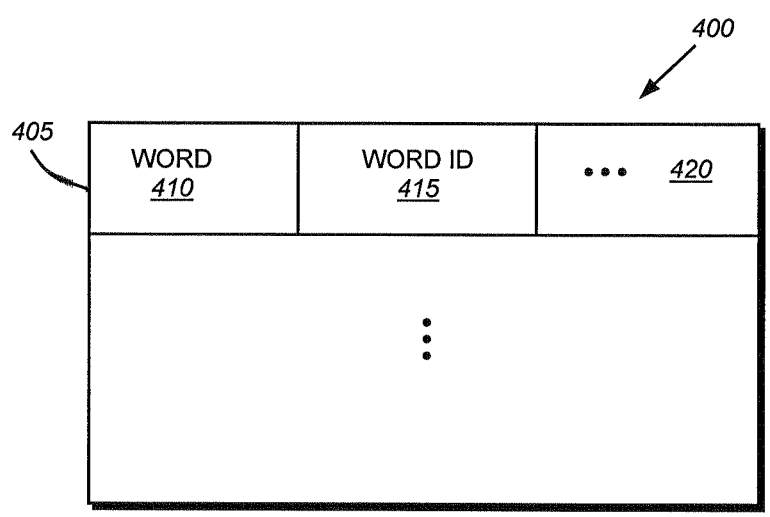
FIG. 4 is a schematic block diagram of an exemplary word table data structure of a database in accordance with an illustrative embodiment of the present invention.

FIG. 4 is a schematic block diagram of an exemplary word table data structure 400 for use in a search database in accordance with an embodiment of the present invention. The data structure 400 includes a plurality of entries 405, each of which comprises a word field 410, a word identifier (ID) field 415 and, in alternate embodiments, additional fields 420. Each word field 410 contains a text string of a particular search indexed word. For example, word field 410 may contain the string "revenue." The word (ID) field 415 contains a numeric identifier associated with the word contained within the word field 410. Thus, for example, the index term "revenue" may be associated with a word ID of 101. The word ID may then be utilized throughout the search database to represent the word contained in word field 410. Thus the word table data structure 400 associates words with numeric identifiers. For search terms that include multiple words, e.g., "Accounts Receivable," a plurality of entries will be created, one for each word of the search term. In such embodiments, the data management module 150 may correlate searches so that the results displayed are only those data containers that include all for the words of the search term.

Figure 5:
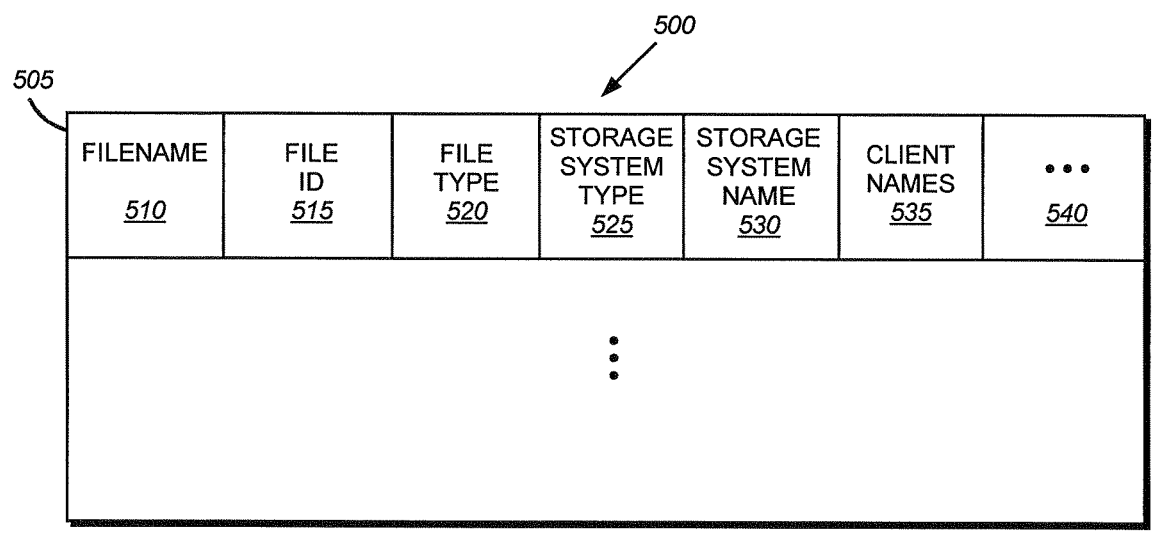
FIG. 5 is a schematic block diagram of an exemplary file table data structure of a database in accordance with an illustrative embodiment of the present invention.

FIG. 5 is a schematic block diagram of an exemplary file table data structure 500 for use in a search database in accordance with an embodiment of the present invention. The file table data structure 500 includes a plurality of entries 505. Each entry 505 illustratively includes a filename field 510, a file identifier (ID) field 515, a file type field 520, a storage system type field 525, a storage system name field 530, a host (client) names field 535 and, in alternate embodiments, additional fields 540. The filename field 510 contains a file name of the data container stored within the storage system by the client. The file identifier field 515 contains an identifier of the file or other data container. The file type field 520 identifies a type of file, e.g., a text file, a Microsoft Word file, etc. The storage system type field 525 identifies whether the data container is stored within, e.g., a SAN or a NAS environment. Illustratively this may be implemented as a Boolean value; however, in alternate embodiments, additional techniques to differentiate the storage environment may be utilized. The storage system name field 530 identifies the storage system storing the data container identified by the entry 505. The client names field 535 identifies clients that have access to the identified data container.

Figure 6:
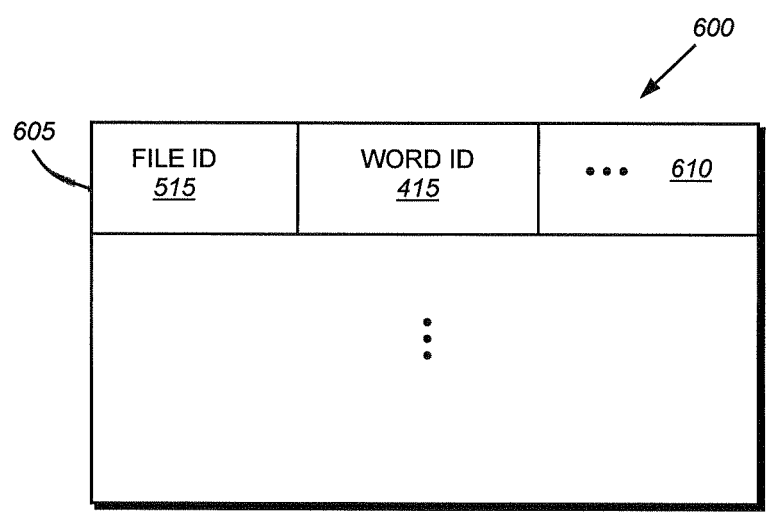
FIG. 6 is a schematic block diagram of an exemplary content table data structure of a database in accordance with an illustrative embodiment of the present invention.

FIG. 6 is a schematic block diagram of an exemplary content table data structure 600 for use in a search database in accordance with an embodiment of the present invention. The content table data structure 600 includes a plurality of entries 605. Each entry 605 includes a file ID field 515, a word ID field 415 and, in alternate embodiments additional fields 610. The file ID field 515 identifies a file (or other data container) stored by a client on the storage system. The word ID field 415 identifies a word from word table data container 400 described above in reference to FIG. 4. Thus, the content data structure 600 provides a mapping between files and search index words. By examining a number identifying a search index word using table 400, a word ID 415 may be located. Then, by examining the content table data structure 600, one or more file ID 515 of data containers containing the identified word may be identified. Utilizing the file identifiers 515, the database may examine the file table data structure 500 to verify additional information relating to the data containers.

Figure 7:
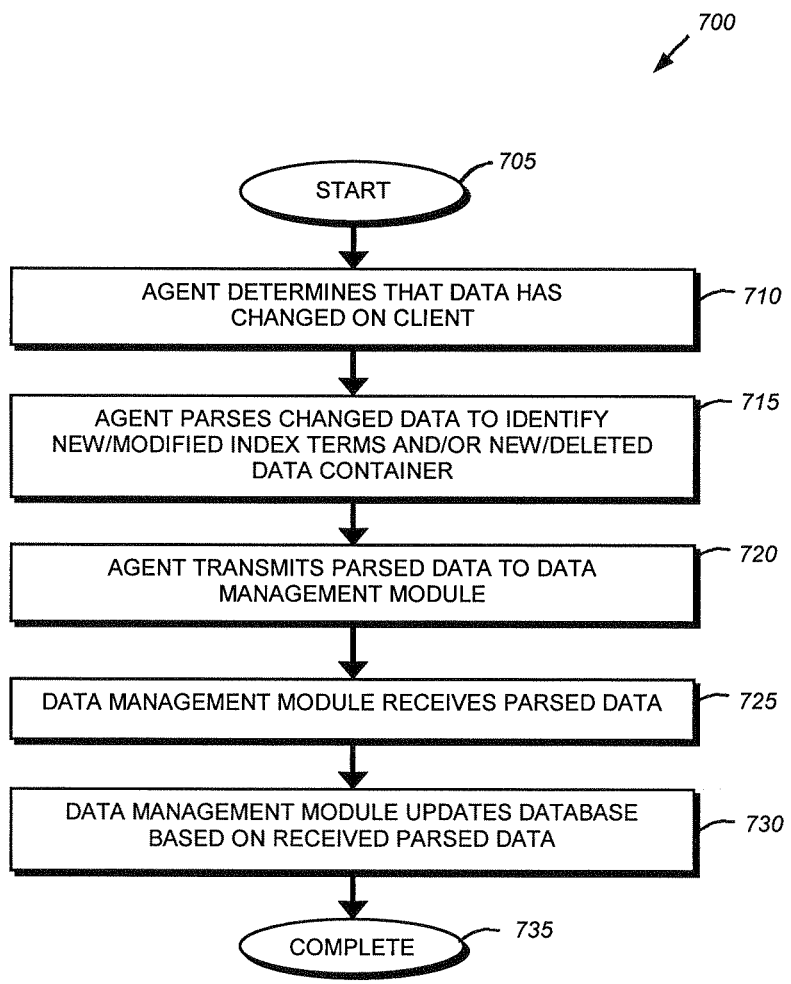
FIG. 7 is a flowchart detailing the steps of a procedure for updating search index information in accordance with an illustrative embodiment of the present invention.

FIG. 7 is a flowchart detailing the steps of a procedure 700 for updating search index information in accordance with an embodiment of the present invention. The procedure 700 begins in step 705 and continues to step 710 where the agent 175 determines that data has been changed on client 110, by, e.g., periodically querying a file system or other component of the operating system 172 to identify recently modified data containers. Alternately, the agent 175 may routinely perform a scan of the file system and/or overlaid storage to determine recently modified data containers. It should be noted that in an alternate embodiment of the present invention, the agent may be configured to ignore certain data containers from being indexed. For example, should an administrator know that a particular storage system is under heavy I/O, the administrator may configure the system to not scan and/or index data containers associated with that storage system.

In response to determining that data has been changed, the agent 175 parses the changed data to identify new/modified index terms and/or new/deleted data containers in step 715. Such parsing may be performed by, for example, the agent 175 reading the new and/or modified data containers to identify certain search terms. The agent may parse the data by, for example, invoking file system and/or volume manager read functionality contained within the operating system. Alternately, the agent 175 may utilize an application, such as a database application executing on the client, to perform read operations to identify the new index terms. The agent then transmits the parsed data to the data management module in step 720. The agent 175 may transmit the data to the data management module using conventional remote procedure calls (RPCs). However, in alternate embodiments, the agent 175 may transmit data using any acceptable point-to-point data transmission technique. As such, description of the utilization of RPCs should be taken as exemplary only.

As the agent 175 executes on the client 110 and may access file system and/or volume manager functionality of the operating system 172, data may be indexed that is not stored in the storage system's native data format. That is, client data may utilize any form of data format overlaid onto luns (or other storage) exported from the storage system 120. By utilizing the novel agent 175, user data may be indexed regardless of the data format utilized by the storage system. Furthermore, the present invention permits user data indexing on storage systems that do not include indexing functionality within a storage operating system.

The data management module 155 receives the parsed data in step 725 and updates the search database 158 with the received parsed data in step 730. For example, data management module receives the parsed data and generates appropriate word entries within word table data structure 400. Furthermore, the data management module may create additional associations within the content table data structure 600. If the parsed data signifies that a new data container has been created, a new entry may be generated in the file table data structure 500. By updating the search database, the data management module enables future queries to return the most up-to-date information.

Procedure 700 may be performed by a plurality of agents that may update a single data management module 155 and search database 158. However, in alternate embodiments, a plurality of data management modules may be updated. If a single data management module and search database are utilized a user may be able to perform broader searches by querying a central data management module. The procedure 700 then completes in step 735.

Figure 8:
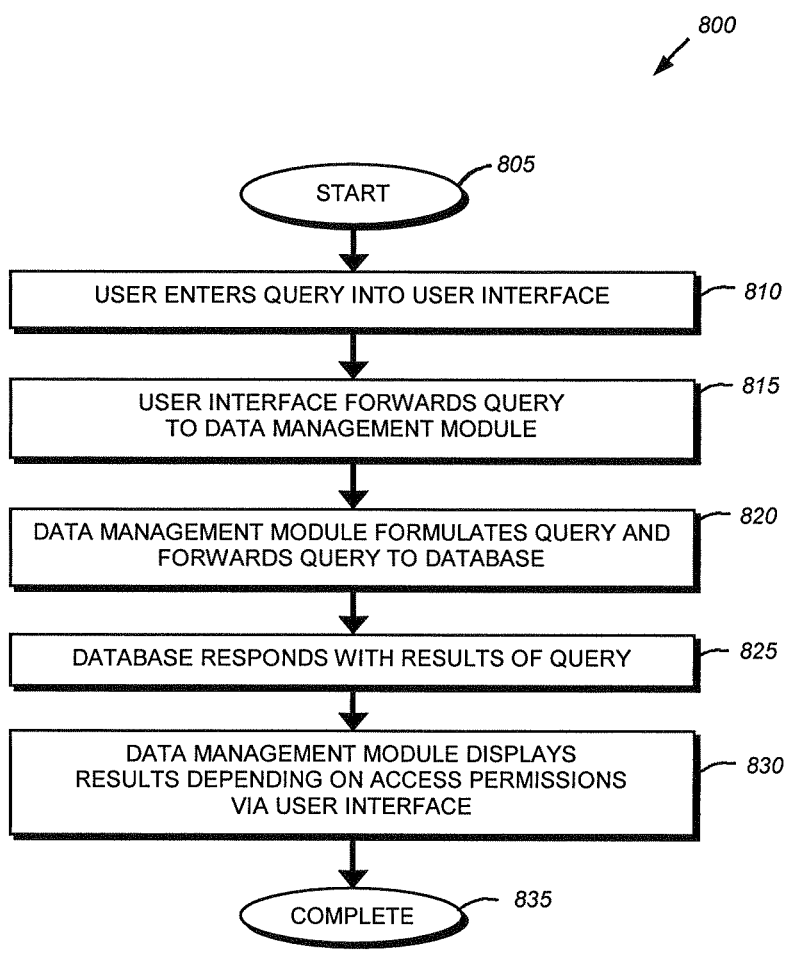
FIG. 8 is a flowchart detailing the steps of a procedure for querying a search database in accordance with an illustrative embodiment of the present invention.

FIG. 8 is a flowchart detailing the steps of a procedure 800 for responding to search queries in accordance with an embodiment of the present invention. The procedure 800 begins in step 805 and continues to step 810 where a user enters a query into the user interface 152 of the data management module 155. An exemplary query may be to identify all data containers containing a particular search term. Such a query may be utilized by the user (e.g. an administrator) to identify particular subsets of the overall data containers for use in data management. The user interface 152 then forwards the query to the data management module 155 in step 815. The user interface may forward the queries via a local procedure call (LPC), if the user interface and data management module execute on the same management server 150, or via a RPC should the data management module and the user interface execute on differing servers. It should be noted that in alternate embodiments other forms of interprocess communication may be utilized. Furthermore, the user interface may be integrated into the data management module, thereby obviating the need for interprocess communication. The data management module formulates a query, e.g., a SQL query, and forwards the query to the database in step 820. The query represents the query entered by the administrator in step 810 above. It should be noted that the description of the use of SQL should be taken as exemplary only and that other forms of database querying techniques may be utilized in accordance with the principles of the present invention.

The database performs the query and responds with the results of the query in step 825. In the example of the database schema described above in reference to FIGS. 4-6, the database may examine the word table data structure 400 to identify appropriate word IDs associated with the index terms to be queried. The word IDs may then be located within the content table data structure 600 to identify one or more file identifiers of data containers including the identified search terms. The file identifiers may then be utilized to identify the appropriate entries in table 500. The information in table 500 may further be utilized to formulate the response to the query. The data management module displays results based on, e.g., access permissions via the user interface in step 830. In the illustrative embodiment, the data management module may perform an access control check before displaying the results of the query. Thus, for example, should a plurality of clients utilize a common data management module, results returned from the search database 158 may include matches from clients other than the one associated with the particular user. Thus, the data management module 155 may filter responses before display to pre-vent users from obtaining matches on other clients. The procedure 800 then completes in step 835.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for indexing data overlaid on a storage space exported by a storage system, including a processor and a memory, to a client, the method comprising:

determining, by an agent executing on the client, that the data, associated with data containers of the storage system managed by the client, has been modified by the client, wherein the agent utilizes functionality of a client-based file system to access the data overlaid on the storage space exported by the storage system to determine the modified data, wherein the client-based file system has a format different than that of the storage system's native file system format, the native file system configured to perform indexing functionality; and in response to determining that the data has been modified by the client, utilizing the functionality of the client-based file system, to access the data overlaid on the storage space exported by the storage system to:

parse, by the agent, the modified data, transmit, from the client to a management server, the parsed data, and update a search database associated with the management server utilizing the parsed data, whereby the data stored on the storage system is indexed, wherein updating the search database includes:

(i) generating one or more word entries, for the parsed data, within a word table data structure of the search database that associates each word entry with a numeric identifier, (ii) creating associations within a content table data structure of the search database that provides at least a mapping between a particular word entry stored in the word table data structure and file entries stored in a file table data structure of the search database utilizing the numeric identifier, and (iii) generating a new entry for the file table data structure when the parsed data indicates that a new data container has been created.

2. The method of claim 1, wherein parsing the modified data further comprises identifying new index terms within the modified data.

3. The method of claim 1, wherein parsing the modified data further comprises identifying modified index terms within the modified data.

4. The method of claim 1, wherein parsing the modified data further comprises identifying one or more additional new data containers.

5. The method of claim 4, wherein the new data container comprises a file.

6. The method of claim 1, wherein parsing the modified data further comprises identifying deleted data containers.

7. The method of claim 1, wherein parsing the modified data further comprises reading the modified data by the agent using the client-based file system functionality.

8. The method of claim 1, wherein parsing the modified data further comprises reading the modified data by the agent using an application program executing on the client.

9. The method of claim 8, wherein the application program comprises a volume manager.

10. The method of claim 8, wherein the application program comprises a database program.

11. The method of claim 1, wherein a data management module executes on the management server operatively interconnected with the client.

12. The method of claim 1, wherein the agent that utilizes the client based file system functionality to access the data overlaid on the storage space exported by the storage system, further comprises: querying, by the agent, the file system of an operating system executing on the client utilizing a first protocol to access the data overlaid on the storage space, that includes logical unit numbers (luns), exported by the storage system, wherein the first protocol is different from a second protocol being utilized by the storage system.

13. A system for indexing data, the system comprising:

a storage system, including a computer processor and a computer memory, configured to export the data overlaid on storage space for use by a client; and an agent executing on the client, the agent configured to identify modified data by utilizing functionality of a client-based file system to access the data overlaid on the storage space exported by the storage system, the client-based file system having a format that is different than that of the storage system's native file system format that is configured to perform indexing functionality, and in response to identifying the modified data utilizing the functionality of the client-based file system, to access the data overlaid on the storage space exported by the storage system, the computer processor configured to:
parse the modified data, and
forward the parsed modified data from the client to a management server, wherein the management server is configured to update a search database associated with the data management server using the parsed data, wherein updating the search database includes:
(i) generating one or more word entries, for the parsed data, within a word table data structure of the search database that associates each word entry with a numeric identifier,
(ii) creating associations within a content table data structure of the search database that provides at least a mapping between a particular word entry stored in the word table data structure and file entries stored in a file table data structure of the search database utilizing the numeric identifier, and
(iii) generating a new entry for the file table data structure when the parsed data indicates that a new data container has been created.

14. The system of claim 13, wherein the client utilizes the exported storage space to store structured data from an application.

15. The system of claim 13, wherein the agent parses the modified data utilizing the client-based file system functionality.

16. The system of claim 13, wherein the agent parses the modified data using an application executing on the client.

17. The system of claim 13, wherein a data management module executes on the management server operatively interconnected with the client.

18. The system of claim 13, wherein the management server is further configured to, in response to a user request, perform a query of the search database and display results of the query.

19. A non-transitory computer readable medium containing executable program instructions executed by a processor, comprising:
program instructions that determine, by an agent executing on a client, that data has been modified by the client, wherein the agent utilizes functionality of a client-based file system to access the data overlaid on the storage space exported by the storage system to determine the modified data, wherein the client-based file system has a format different than that of the storage system's native file system format that is configured to perform indexing functionality; and
program instructions that, in response to identifying the modified data, utilizes the functionality of client-based file system to access the data overlaid on the storage space exported by the storage system, the program instructions executable to:
parse the modified data,
transmit, from the client to a management server, the parsed data, and
update a search database associated with the management server utilizing the parsed data, wherein updating the search database includes:
(i) generating one or more word entries, for the parsed data, within a word table data structure of the search database that associates each word entry with a numeric identifier,
(ii) creating associations within a content table data structure of the search database that provides at least a mapping between word entries stored in the word table data structure and file entries stored in a file table data structure of the search database utilizing the numeric identifier, and
(iii) generating a new entry for the file table data structure when the parsed data indicates that a new data container has been created.

* * * * *

UNITED STATES PATENT AND TRADEMARK OFFICE
CERTIFICATE OF CORRECTION

| | | |
|---|---|---|
| PATENT NO. | : 8,868,495 B2 | Page 1 of 1 |
| APPLICATION NO. | : 11/847925 | |
| DATED | : October 21, 2014 | |
| INVENTOR(S) | : Yusuf Batterywala | |

It is certified that error appears in the above-identified patent and that said Letters Patent is hereby corrected as shown below:

In the specification:

Column 1, line 4 should read:
RELATED APPLICATION

Column 3, line 44 should read:
data containers containing desired search terms.

Column 4, line 28 should read:
dance with an illustrative embodiment of the present invent- Column 5, line 47 should read:
principles of the present invention. Specifically, the agent Column 11, line 13 should read:
include all of the words of the search term.

Column 13, line 32 should read:
before display to prevent users from obtaining matches on In the claims:

Claim 13, Column 14, lines 66-67 should read:
in response to identifying the modified data, utilizing the functionality of the client based file system to access Signed and Sealed this
Seventeenth Day of February, 2015

Michelle K. Lee
*Deputy Director of the United States Patent and Trademark Office*